United States Patent [19]

Jung

[11] Patent Number: 5,061,662
[45] Date of Patent: Oct. 29, 1991

[54] METHOD FOR PREPARING SINTERED BODY OF THE TITANIUM BORIDE AND APPARATUS THEREFOR

[75] Inventor: Jongin Jung, Suwon, Rep. of Korea
[73] Assignee: Samsung Electron Devices Co., Ltd., Rep. of Korea
[21] Appl. No.: 433,523
[22] Filed: Nov. 8, 1989
[51] Int. Cl.$^5$ .............................................. C04B 35/58
[52] U.S. Cl. ..................................... 501/96; 264/56; 264/65
[58] Field of Search ...................... 501/96, 98; 264/63, 264/65, 56; 148/317

[56] References Cited

U.S. PATENT DOCUMENTS

| | | | |
|---|---|---|---|
| 4,268,314 | 5/1981 | Montgomery | 501/98 |
| 4,795,723 | 1/1989 | Nishikawa et al. | 501/98 |
| 4,877,759 | 10/1989 | Holt et al. | 501/96 |

FOREIGN PATENT DOCUMENTS

| | | | |
|---|---|---|---|
| 2536367 | 2/1976 | Fed. Rep. of Germany | 501/96 |
| 2056376 | 3/1987 | Japan. | |
| 1129937 | 5/1989 | Japan. | |
| 1131072 | 5/1989 | Japan. | |

OTHER PUBLICATIONS

Japanese Patent Abstracts 62-56307 3/12/87, "Production of Powder Mixed with Boron Nitride", Numata et al.

*Primary Examiner*—William R. Dixon, Jr.
*Assistant Examiner*—Paul Marcantoni

[57] ABSTRACT

A method for preparing the sintered body of titanium boride being characterized in that 17-27 mol % of metallic titanium powder, 39-74 mol % of boron powder and 1-30 mol % of aluminium powder are wet combined in an anhydrous solvent and pressed at pressure of 500 kg/cm$^2$ to obtain a desired molding. The molding is self burned by a discharge spark under an inert gas condition which is shut tight under a pressure of 1 atm and above to sinter a composite material with constituents of titanium boride 50-80%, boron nitride 10-40% and aluminium nitride 1-30%.

2 Claims, 1 Drawing Sheet

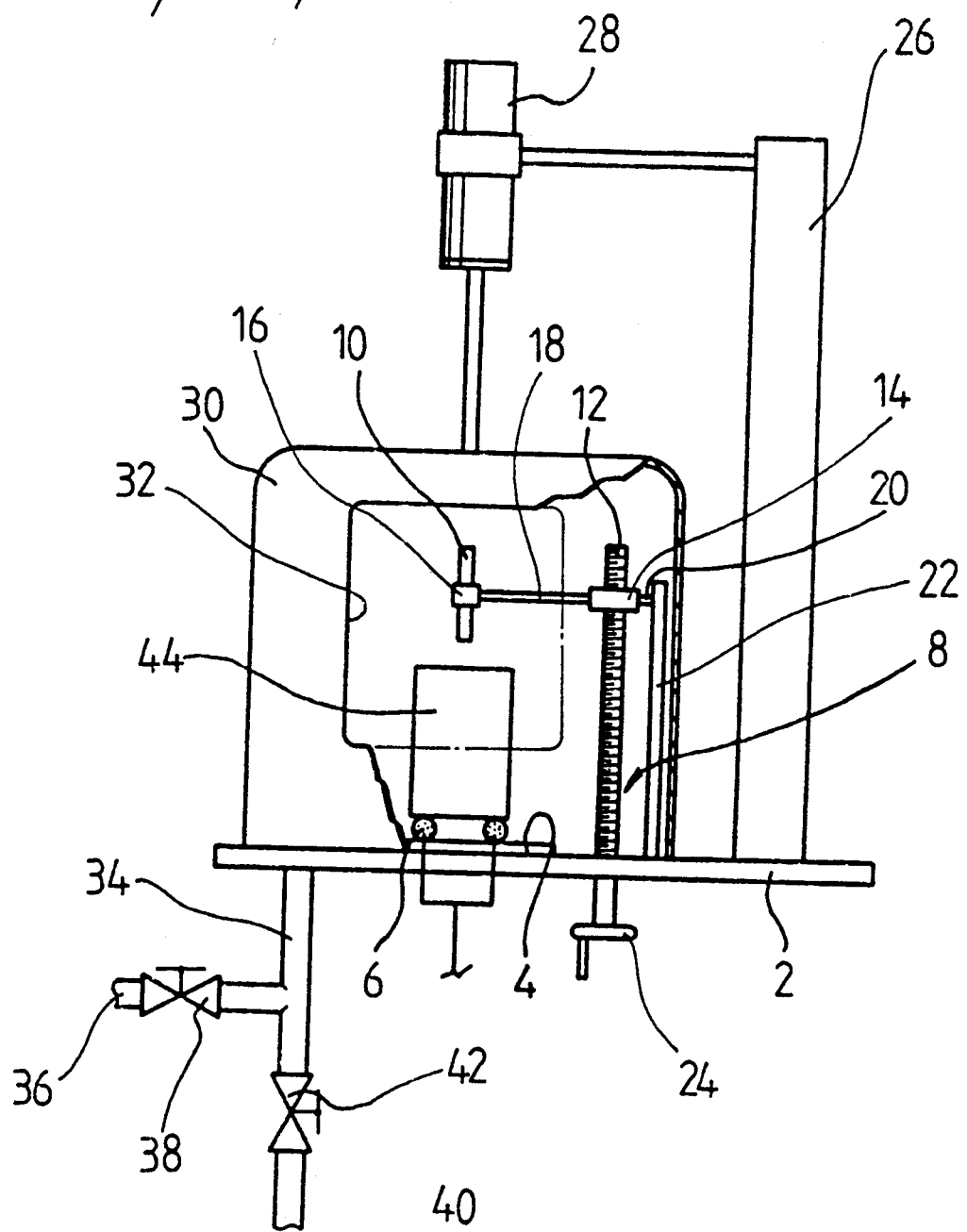

METHOD FOR PREPARING SINTERED BODY OF THE TITANIUM BORIDE AND APPARATUS THEREFOR

BACKGROUND OF THE INVENTION

The present invention relates to a method for preparing a sintered body of titanium boride and an apparatus which is suitable to carry out the method.

Titanium is a light metal of high toughness with silver gray luster, and it is a metallic element of group IV which with other elements is used as additive for alloys.

Boron, like aluminium, is an element of group III, and it is used as a deoxidizer or degasing reagent in metal refining as it is possesed of a character that it readily reacts with oxygen and nitrogen at high temperature.

The influence of the above mentioned titanium and boron on metal alloy is well-known.

The purpose of titanium and boron addition to metal alloy generally is to give toughness to the metal alloy as in high speed cutting tools disclosed in Franks and Field U.S. Pat. No. 1,684,131 of September 1928, or to enhance a certain property of a metal. Compounds of titanium and boron on the other hand are known to have physical property of good endurance at high temperature, and titanium boride is a representative among them.

The abovementioned titanium boride is a solid of high toughness with its melting point of 2,980° C., and is known as a proper material for electrical conductor at high temperature, for example such as the electrode in aluminium refining apparatus or the electrode in aluminium sputtering apparatus, because of its acid resistance and conductivity under high temperature, and also excellent anticorrosion character against molten aluminium.

These titanium borides are generally produced by hot pressure method wherein the mixture of titanium powder and boron powder are applied to high pressure under temperature of 2,000° C. and above to give the sintered body.

However, the sintered body obtained by this method has problem in that it includes portions of nonhomogeneous density, and that molding an adequate shape which fits to its usage is impossible, so the hot pressed sintered body should undergo the next process, which is to get these portions of nonhomogeneous density eliminated and to be shaped as desired.

Titanium boride is a material of high toughness as well known, and there is a fair amount of difficulty in forming to desired shape.

Besides, the method of simultaneous sintering wherein titanium powder and boron powder is mixed and molded to a desired shape, then the mold is ignited by force to cause the self burning which emits the heat of reaction that will sinter the mold into titanium boride may be adopted to obtain the sintered body by using the character of boron which cause a self burning when subject to high temperature.

However, the density difference between the reactants and the products during the composing process by the self burning in this method will cause plenty of pores in the sintered body as final object constituting its brittle physical property.

SUMMARY OF THE INVENTION

Accordingly, it is an object of the present invention to provide a method for preparing sintered body of titanium boride with a good forming quality and no local density difference, and to provide a producing apparatus that properly embodies the method.

A method for preparing sintered body of titanium boride according to the present invention is featured by the fact that the method is carried out by the molding process wherein the metallic titanium powder, boron powder and aluminium powder are wet combined to an anhydrous solvent in a desired combining ratio, then pressed to mold into the desired shape, and by the sintering process wherein the molding from the molding process is self burned under inert gas condition such as nitrogen.

The combination ratio of the molding in the aforementioned method is in the range of metallic titanium powder 17-27 mol %, boron powder 39-74 mol % and aluminium powder 1-30 mol %, and the powder particle sizes should be limited within the range of 1-10 $\mu$m.

And the anhydrous alcohol can be used as the anhydrous solvent for the wet combining agent of these powders.

The proper molding pressure for the combination is 500 kg/cm$^2$, and the molding process is carried out at the nitrogen gas condition of 1 atm pressure.

The producing apparatus for embodying the method of the present invention is constituted by a bed and a sealed container which isolates the upper part of the bed from outside; a conduit with a vacuum valve and a nitrogen injection valve is connected to the lower part of said bed; a carbon electrode and an arc electrode are disposed facing each other on said bed, the spacing between said arc electrode and said carbon electrode being adjustable by the elevating means for said arc electrode.

Other features and advantages of the present invention will be rather clearly presented by the following description with reference to the drawing.

BRIEF DESCRIPTION OF THE DRAWING

Attached drawing illustrates the side view in part section of the producing apparatus that properly embodies the producing method of the present invention.

First, the producing apparatus that properly embodies the present invention is comprised as follows:

The bed 2 includes the carbon electrode 6 installed on the bed 2 with an isolating plate placed between the carbon electrode 6 and the bed, and an arc electrode 10 suspended by the elevating means 8 to be disposed facing with said carbon electrode.

Aforementioned elevating means 8 comprises a rotatable screwed bar 12 which is installed vertically on the upper part of the bed 2, an arm 18 extended horizontally from a boss 14 which goes up and down by the thread in the screwed bar 12 with an electrode holder 16 attached at an end of the arm 18, and a guide 22 which is extended parallel with said screwed bar 12 so as to guide the slider 20 that is extended from said boss 14 to the opposite direction of the arm 18.

Aforementioned screwed bar 12 is installed passing through the bed 2, and a handle 24 is attached at the lower end which extended below bed 2 so that the screwed bar 12 can be rotated by handle 24.

A support 26, on the other hand, is fixed on a side of the bed 2 in order to suspend an actuator 28, like an air cylinder for instance, from the support 28.

By operating said actuator 28 a cover 30 will be placed to shut tight on the upper part of the bed 2.

Aforementioned cover 30 will be provided with a inspecting window 32 so that one can inspect the state inside eventhough the upper part of the bed 2 is isolated from outside.

Beneath the bed 2, a conduit 34 is connected to the space isolated from outside by the cover 30.

This conduit 34 include a vacuum valve 38 communicating with a suction pipe 36 and an injection valve communicating with injection pipe 40 acting as a injection passage for the nitrogen gas.

Next, the producing method for the sintered body of the titanium boride utilizing the producing apparatus for the present invention as described is explained according to the embodiment.

EMBODIMENT OF THE PRESENT INVENTION

MOLDING PROCESS

| | |
|---|---|
| Metallic titanium powder | 20 mol % |
| Boron powder | 40 mol % |
| Aluminium powder | 10 mol % |

The above compositions are filtered through the mesh size of 3 μm and they are wet combined in the anhydrous alcohol, then it is put into a normal press molder wherein a pressure of 500 kg/cm² is applied and desired molding is made.

SINTERING PROCESS

The molding 44 made by the above mentioned process is put on the carbon electrode 6 disposed on bed 2.

The actuator 28 is operated by getting the cover 30 coat the upper part of the bed 2 to make it isolated from outside, then the vacuum valve 38 is opened to evacuate the space shut tight by the cover 30.

Next, the injection valve 42 is opened to fill said space with nitrogen.

In this way, the isolated space on the bed 2 is subject to an inert gas condition, a high voltage is impressed between the carbon electrode 6 and the arc electrode 10, then the handle 24 is manipulated to lower the boss 14 along the screwed bar 12, and then the arc electrode 10 come adjacent to the molding 44 thus commencing discharging.

As the molding 44 receive the discharge spark, it begins self burning whereby the molding is sintered to be the titanium boride and the excess of boron or aluminium react with nitrogen gas leaving some nitrade to the sintered body.

The reaction formula in the case is:

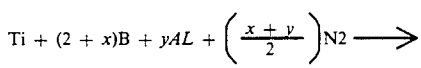

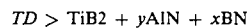

(here, x and y represent the excess of boron and aluminium respectively).

In the above mentioned sintering process, excess of boron and aluminium are secondary-mineralized into boron nitride and aluminium nitride respectively leaving the sintered body obtained free from pores hence the sintered body formed fine.

In addition to above, because the boron nitride behaves as a solid lubricant, the titanium boride sintered body obtained by the present invention can be easily cut and permeation of the molten aluminium is prevented thus making the electrode seldom corrode when employed as an electrode for aluminium refining.

What is claimed is:

1. A method for preparing a sintered body of titanium boride which comprises: wet combining 17-27 mol % of metallic titanium powder, 39-74 mol % of boron powder and 1-30 mol % of aluminum powder in an anhydrous solvent and molding the same at a pressure of 500 kg/cm², thereby obtaining a desired molding; self burning the molding under nitrogen gas at a pressure of 1 ATM and above, to a sintered composite including titanium boride 50-80%, boron nitride 10-40% and aluminum nitride 1-30%.

2. A method for preparing the sintered body of titanium boride as claimed in claim 1, wherein the particle sizes of the powders are within the range of 1-10 μm.

* * * * *